May 15, 1928.
A. T. KASLEY
1,670,072
POWER GENERATOR
Filed June 6, 1921
2 Sheets-Sheet 2
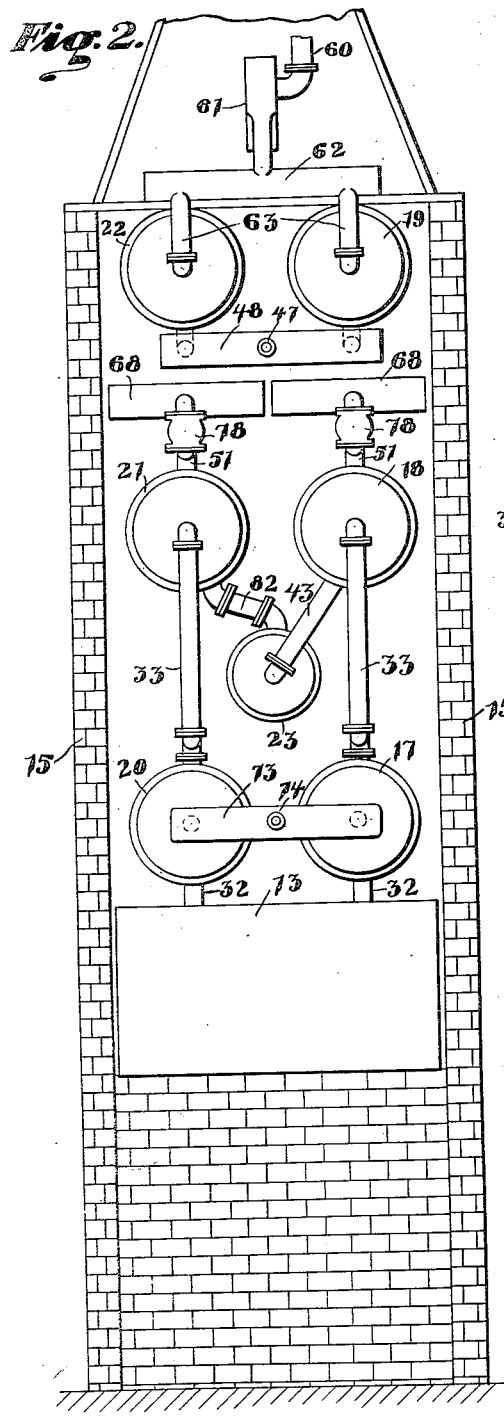
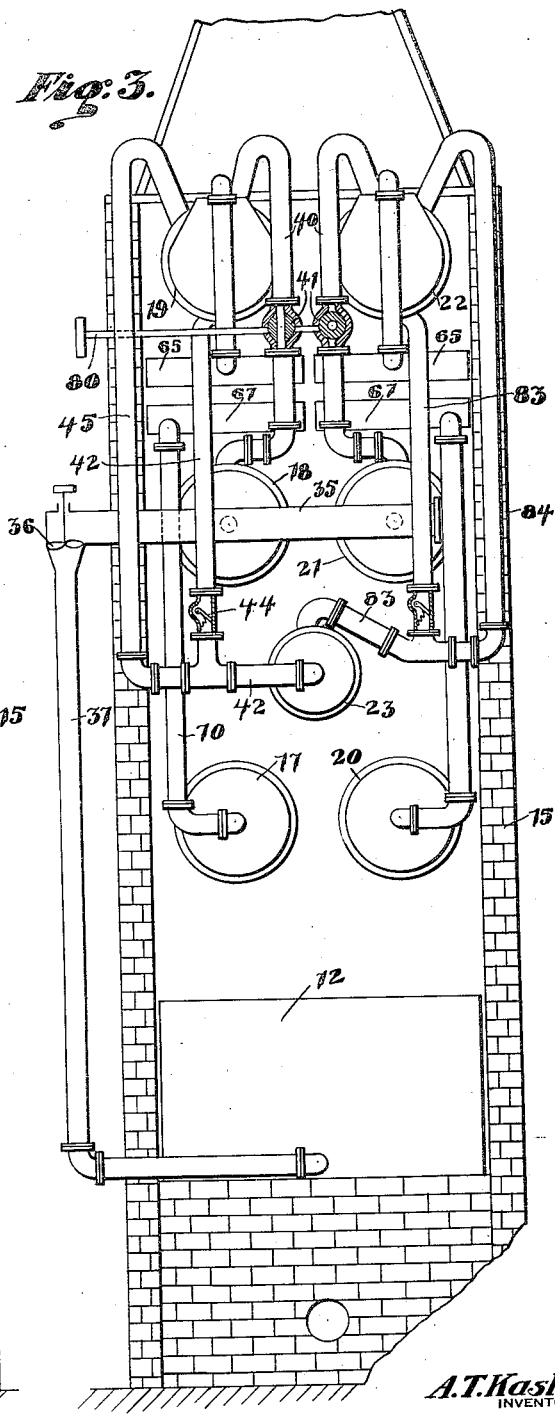
A. T. Kasley
INVENTOR
BY D. C. Davis
ATTORNEY Patented May 15, 1928.

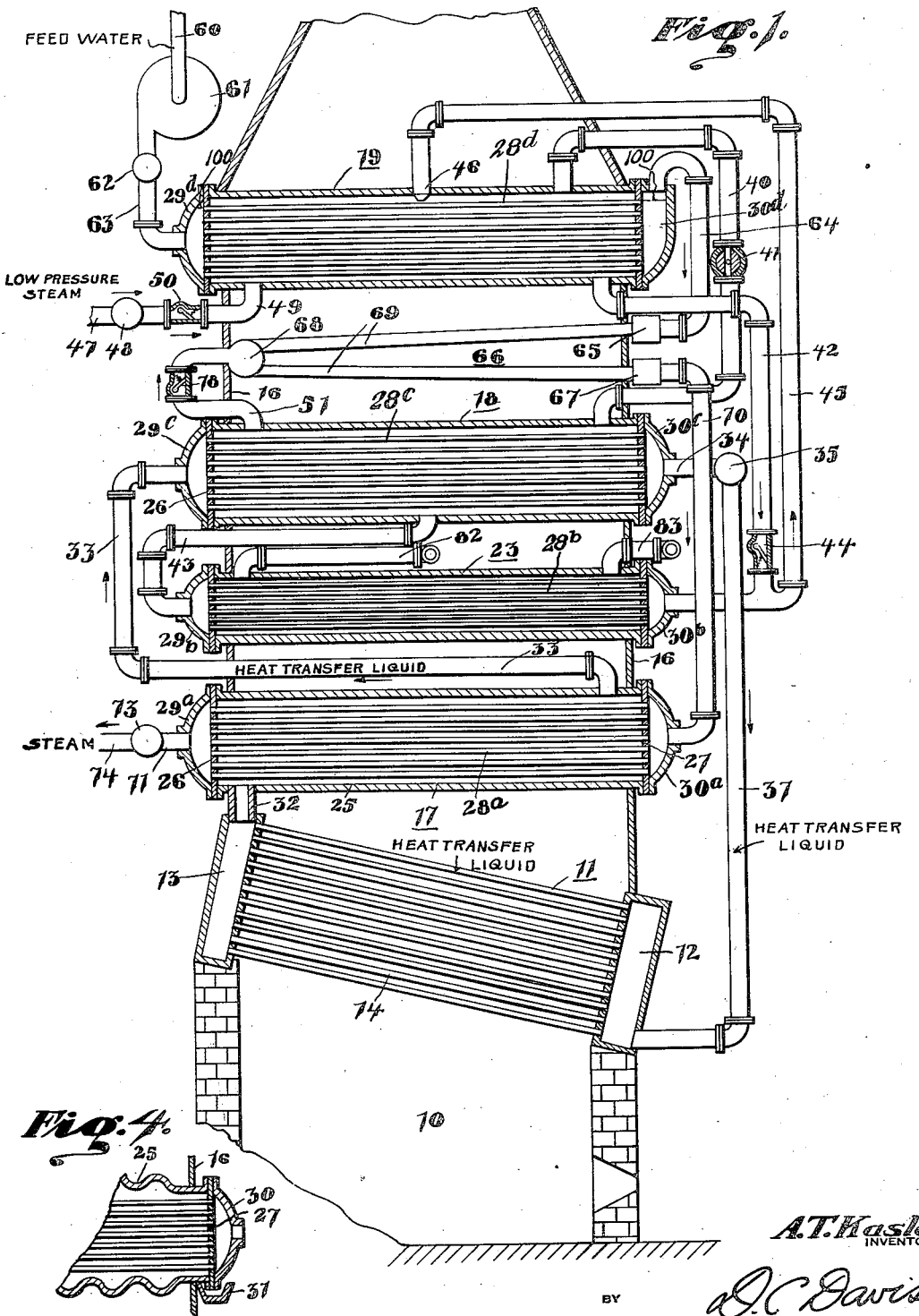

1,670,072

UNITED STATES PATENT OFFICE.

ALEXANDER T. KASLEY, OF ESSINGTON, PENNSYLVANIA, ASSIGNOR TO WESTINGHOUSE ELECTRIC AND MANUFACTURING COMPANY, A CORPORATION OF PENNSYLVANIA.

POWER GENERATOR.

Application filed June 8, 1921. Serial No. 475,361.

This invention relates to motive fluid generators and it has for an object the provision of a novel and improved process and apparatus of the character designated which shall utilize latent heat of an exhaust fluid for the production of a high-pressure motive fluid. It is a further object of my invention to provide in a method and apparatus of the character designated a means for utilizing a fluid of high absorptive affinity for absorbing exhaust fluids at a low pressure and for giving off, when subjected to relatively high temperatures, a high-pressure motive fluid. A still further object of my invention is to provide a method and means of the character designated in which a fluid of high absorptive affinity shall not only serve to absorb an exhaust fluid at low temperatures and give off a motive fluid at high temperatures but in which the fluid shall also give up heat to a separated body of liquid for the further generation of a motive fluid.

These and other objects, which are made more manifest throughout the description of my invention, may be attained by the employment of the apparatus herein described and illustrated in the accompanying drawing, in which Fig. 1 is a diagrammatic view in vertical section of an apparatus constructed in accordance with my invention;

Fig. 2 is a view, in elevation, of one end of the apparatus illustrated in Fig. 1, the outer gas-retaining walls between the several drums being removed to show more clearly the arrangement of connecting conduits;

Fig. 3 is a view in vertical elevation of the other end of the apparatus, the outer gas retaining walls being removed as in Fig. 2; and Fig. 4 is a fragmentary detail of a modified form of drum provided with a drip trough.

The construction of steam power plants, now in general use and operating upon a closed cycle, provides for the condensation of all of the motive steam and its subsequent return to the generating unit. In this mode of operation, a very large proportion of the heat of the steam is dissipated in the condenser cooling water and is lost for the performance of useful work. It is obvious that if the entire mass of steam, after having performed useful work, could be economically returned to the steam generating unit, a great saving of energy in the form of latent heat of the steam would be effected. Devices of this character have been heretofore proposed but have not proven commercially successful due to the excessive expenditure of energy required to return all the steam to the generator in a vaporous state.

The present invention contemplates the provision of means for returning a considerable portion of the exhaust steam of a power plant directly to the steam generator in a vaporous state and for returning the remainder of the exhaust steam to the generator in the form of condensate.

In the operation of power plants, a considerable amount of steam is exhausted from auxiliaries at about atmospheric pressure. Again, in certain types of pressure fluid motors, as for example, steam turbines in which the off-take passages are maintained at a high vacuum, it is advantageous to tap off a portion of the steam during the process of expansion at an intermediate stage. I propose to return this steam, discharged from the auxiliaries and tapped from intermediate stages of steam-operated prime movers at substantially atmospheric pressure, directly back into the steam generator. This mode of operation is accomplished in a construction embodying my present invention without the expenditure of energy in pumping the exhausted fluid into the generator.

My novel apparatus comprises two connected receptacles containing a fluid having a high absorptive affinity for water vapor, such as the solutions of the hydroxides of the alkaline group, as for example, a solution of caustic soda or potash, which is hereinafter for brevity and distinction termed the caustic solution. The receptacles are preferably arranged at different levels, the upper receptacle being subjected to the cooling action of a separated body of water, and the lower receptacle to the heating action of a hot circulating fluid from an external source. The connections between the receptacles are such that when the upper portions of the receptacles are placed in communication to equalize the pressures therein, the solution flows from the upper to the lower receptacle. When, however, the connection between the upper portions of the receptacles is closed, the heating fluid passing through the lower receptacle builds up a pressure therein so that the caustic solution is forced through suitable connections from the bottom of the lower receptacle and sprayed downwardly into the upper receptacle. The affinity of the caustic solution for water and vapor produces a low pressure in the upper receptacle and readily permits the admission of low pressure steam into the solution within the upper receptacle. The latent heat of the steam, as well as the heat of combination caused by absorption of steam in the caustic solution, is transmitted to the separated body of water within the upper receptacle and serves to generate steam therefrom. When in turn, the diluted solution is passed to the lower receptacle, steam is driven off from the diluted solution because of the heat imparted thereto by means of the hot circulating fluid, which steam may be caused to commingle with the steam driven off from the separated body of water in the upper receptacle and serve as a motive fluid for the prime mover. Greater efficiency in the generation of steam is obtained by cooling the caustic solution during its passage from the lower to the upper receptacle and by heating the solution in its passage from the upper to the lower receptacle, operations which may be readily accomplished in a suitable regenerator.

In supplying heat to the lower receptacle containing the caustic solution, any form of primary circulating heater may be used. I have found it to be advantageous however, to use an anhydrous caustic soda or potash, or a mixture of the two, as the circulating medium and to heat the medium in a tubular boiler by means of a directly fired furnace. I have likewise found it advantageous to superheat the steam generated in the apparatus by passing it through an intermediate separate-fluid heat exchanger of the two-fluid type through which the liquid anhydrous caustic is caused to pass on its way to the lower caustic solution chamber. The apparatus, as above outlined, provides steam at a workable pressure with a high degree of superheat.

In the operation of the process and apparatus of my present invention, I have found that very satisfactory results may be obtained by returning about 40 per cent of the exhaust steam directly into the caustic solution in the upper caustic chamber and returning the remaining 60 per cent of the exhaust steam, in the form of condensate, to the separated water compartment of the upper caustic chamber.

Referring to the drawing for a more detailed description of an apparatus embodying my invention, I have indicated a fire box at 10 which may be of any common and well known construction. Supported above the fire box is a boiler 11 of the inclined tubular type and comprising a front header 12 and a rear header 13 connected by the inclined tubes 14. Supported above the boiler 11 and extending through the combustion off-take defined by side walls 15 and end gas-retaining walls 16 are two vertical series of drums, a superheater drum 17, an evaporator drum 18 and an absorber drum 19 constituting one vertical series, and a superheater drum 20, an evaporator drum 21, and an absorber drum 22 constituting a second vertical series. Each of the vertical series with its connecting conduits is identical in construction and functions independently of the other series, with the exception of a common regenerator 23, hereinafter more fully described, so that a detailed description of one of the vertical series of drums is sufficient for the purposes of this specification.

The several drums are substantially identical in construction and may be of any well known two-fluid heat exchanger type. As shown, each drum comprises a cylindrical portion 25 upon which are mounted tube plates 26, 27, into which are suitably secured tubes $28^a$, $28^b$, $28^c$ and $28^d$ respectively. End distributing box members $29^a$, $30^a$, $29^b$, $30^b$, $29^c$, $30^c$, $29^d$ and $30^d$ are secured to the tube plates 26, 27 and to the cylindrical shell 25 by bolts or in any other well known manner. The cylindrical portions 25 of the drums may be axially corrugated, as shown in Fig. 4, to compensate for differences in expansion and contraction between the cylindrical shell and the tubes $28^a$, $28^b$, $28^c$ and $28^d$, and to expose a greater heat absorbing surface to the combustion gases. Drip pans 31 may be disposed without the walls 16 and immediately beneath the joints formed by the cylinder, tube plates and distributing boxes to catch any of the caustic solution that may leak therethrough. Each drum may be said to have two chambers, a cylindrical chamber defined by the shell 25 and the tube plates 26, 27, not including spaces within the tubes $28^a$, $28^b$, $28^c$ and $28^d$, and a tubular chamber comprising the spaces defined by the distributing boxes $29^a$—$30^a$, $29^b$—$30^b$, $29^c$—$30^c$ and $29^d$—$30^d$ and the spaces within the associated tubes $28^a$, $28^b$, $28^c$ and $28^d$.

The upper header 13 of the boiler 11 communicates with the cylindrical chamber of the drum 17 by means of a nipple 32 which preferably opens into the chamber at one end thereof. Adjacent the opposite end of the cylindrical chamber of the drum 17, a pipe 33 extends rearwardly and upwardly and communicates with the rear distributing box $29^c$ of the evaporator drum 18. The opposite distributing box $30^c$ of the drum 18 is provided with a discharge pipe 34 which enters the manifold 35. At one end of the manifold 35 is a pump 36 which is arranged to force fluid from the manifold 35 downwardly through a pipe 37 to the lower portion of the header 12.

The elements hereinabove recited define what may be termed a primary heating circuit. The heating fluid may be said, for the purpose of tracing the cycle, to start from the header 12, traverse the tubes 14, enter header 13, pass the nipple 32 into the cylindrical portion of the superheater drum 17 in which the heating fluid passes about the tubes 28$^a$ and is discharged through the conduit 33 into the distributing box 29$^c$ of the evaporation drum 18, whence it passes through tubes 28$^c$ of the evaporator drum 18 and is discharged through the distributing box 30$^c$, pipe 34, manifold 35, pump 36 and pipe 37 back into the lower portion of the header 12. It will be noted that the primary heating fluid thus traverses a thermo-siphonic cycle and that the heating fluid is capable of traveling in this cycle without the use of a forcing means. However, I prefer to employ a pump 36 in order to create a more rapid circulation of the primary heating fluid and thus secure a more uniform distribution of the furnace heat.

A secondary heating fluid, preferably a solution of an hydroxide of the alkaline group, as for example, caustic soda, is contained within the cylindrical chamber of the evaporator drum 18 and in the cylindrical chamber of the absorber drum 19. The upper portions of the cylindrical chambers of the drums 18 and 19 are connected by means of a pipe 40 in which is interposed a valve 41. A pipe 42 leads from the lower portion of the cylindrical chamber of the absorption drum 19 to the distributing box 30$^b$ of the regenerator 23, the arrangement being such that fluid may traverse the tubes 28$^b$ and box 29$^b$ of the regenerator drum 23 and a conduit 43 which leads into the lower portion of the cylindrical chamber of the evaporator drum 18. A downwardly opening check valve 44 is disposed within the conduit 42. Leading from the conduit 42 below the check valve 44 is a conduit 45 which leads to the central upper portion of the cylindrical chamber of the absorption drum 19, the end of the conduit 45 within the drum 19 being provided with a suitable spray member 46. A pipe 47 communicating with any source of low-pressure steam as, for example, steam tapped from the intermediate stage of a turbine, leads to a manifold 48, thence through a pipe 49 to the lower portion of the cylindrical chamber of the absorption drum 19, an inwardly-opening check valve 50 being interposed in the pipe 49. A steam discharge pipe 51 leads from the upper portion of the cylindrical chamber of the evaporation drum 18 and serves to deliver the high-pressure steam from within the cylindrical chamber of the evaporator 18, as will be hereinafter more fully described.

The alternate flow of the secondary heating fluid between the evaporator 18 and the absorber 19 is carried out in the following manner. Assuming the valve 41 to be closed, the pressure within the evaporator 18 will become higher than the pressure in the absorber 19, due to the fact that the secondary heating fluid, the caustic solution, in the evaporator 18 will be subjected to the higher temperature of the primary heating fluid flowing through pipes 28$^c$ while the secondary heating fluid in absorber 19 is subjected to the lower temperature of feed water flowing through pipes 28$^d$. The caustic solution will therefore pass downwardly through pipe 43, through the regenerator 23 where the temperature of the fluid will be greatly reduced, due to the lower temperature of the secondary heating fluid from absorber 22 which is flowing through the cylindrical chamber of regenerator 23 at this time, as will be hereinafter further explained, and will pass upwardly through pipes 45 and sprayed downwardly within the absorber 19. During this phase of operation the pressure within the absorber will be low, due to the strong affinity of the relatively cool and concentrated caustic solution for steam and water vapor, so that low-pressure steam may enter the absorber through the pipe 49, diluting the solution within the absorber. The latent heat of the steam and the heat that is generated in the absorber 19 is carried away by the fluid traversing the tubes 28$^d$ of the absorber 19, as will be hereinafter described. Upon opening the valve 41, the pressures within the cylindrical chambers in the evaporator 18 and absorber 19 are equalized and the diluted caustic solution from the absorber 19 flows downwardly through the pipe 42, past the check valve 44, through the regenerator 23 where its temperature is increased, thence through the pipe 43 to the evaporator 18. The diluted solution within the cylindrical chamber of the evaporator 18, now being subjected to the high temperature of the primary heating fluid passing through the tubes 28 of the evaporator 18, undergoes an increase in temperature, and steam collecting in the upper portion of the evaporator, is discharged through the pipe 51. The valve 41 is opened and closed at regular intervals to accomplish the alternate passage of concentrated caustic solution from the evaporator 18 to the absorber 19, and the passage of diluted caustic solution from the absorber 19 to the evaporator 18.

In addition to the steam generated from the caustic solution, provision is made for generating steam directly from water, as for example, the condensate of the steam from a prime mover. A pipe 60 delivers water to a suitable pump 61 which discharges the water under pressure into a manifold 62. A pipe 63 leads from the manifold 62 to the box 29$^d$ of the absorber 19, the arrangement being such that the water assumes a certain definite level 100 within the water boxes 29$^d$ and 30$^d$ and within the tubes 28$^d$ of the absorber 19. A pipe 64 leads from the upper portion of the distributing box 30 to a manifold 65 of a tubular heater 66. The heater 66 comprises the inlet manifold 65, an outlet manifold 67, and an intermediate manifold 68. Tubes 69 communicate between the intermediate manifold 68 and the inlet and outlet manifolds. The heater tubes 69 and intermediate manifold 68 are exposed directly to the combustion gases in their passage to the stack. A pipe 70 leads from the outlet manifold 67 to the distributing box 30$^a$ of the superheater 17 and a pipe 71 leads from the distributing box 29$^a$ of the superheater 17 to a manifold 73, from which a pipe 74 leads to a steam consumer. The pipe 51 leading from the upper portion of the evaporator 18 discharges into the intermediate manifold 68 of the heater 66 and is provided with an upwardly opening check valve 78.

It will thus be seen that water under high pressure delivered to the tubular chamber of the absorber 19 serves to extract heat from the caustic solution within the cylindrical chambers of the absorber and assists in maintaining a low pressure therein. The steam generated in the tubular chamber of the absorber is discharged to the heater 66, then to the superheater 17, and delivered with a high degree of superheat through the pipe 74 to a steam consumer.

It will be apparent from the above description that my improved generator involves three distinct circuits in each of which the character of the fluid differs. The primary heating fluid absorbs heat from the furnace and transfers it to the steam traversing the superheater 17 and to the caustic solution within the evaporator 18, where steam is caused to be generated from the caustic solution, the primary heating fluid being returned from the evaporator 18 to the boiler. A secondary heating fluid within the cylindrical chambers of the evaporator 18 and the absorber 19 is arranged to be subjected to widely differing pressures. Thus, during the period in which the valve 41 is closed, the fluid within the cylindrical chamber of the absorber is at substantially atmospheric pressure, due to the cooling action of the water traversing tubes 28 and the strong affinity of the caustic solution for steam and water vapor; while, during the period in which the valve 41 is open, the pressure within the cylindrical chambers of both the absorber and evaporator is equalized and is designed to be approximately 150 pounds per square inch. In the main steam generating circuit, the feed water enters the tubular chamber within the absorber 19 and during the low-pressure period therein absorbs sufficient quantities of heat to produce a lively generation of steam, which steam is discharged through the pipe 64 into the heater 66. During the period in which the valve 41 is open the generation of steam within the tubular space of the absorber 19 is not as rapid, but during this period there is a lively evaporation of steam from the diluted solution within the evaporator 18 which steam is discharged through the pipe 51 into the manifold 68 where it commingles with the steam generated in the absorber 19 and passes therewith through the superheater 17 to the point of consumption.

The two vertical series of drums are preferably associated in the generating unit so that the direction of flow of the caustic solution between the absorber and evaporator in one series will be opposite to that in the other series. This may be accomplished by operatively connecting the valves 41 of each series so that when one valve is open, the other is closed, and vice versa. As shown, a common valve stem 80 is provided for both of the valves 41.

The provision for alternate flow of caustic solution in opposite directions between the two sets of absorber and evaporator drums also enables a single regenerator to serve for both series, the lower portion of the evaporator 21 being connected to one end of the cylindrical chamber of the regenerator 23 by means of a pipe 82. From the opposite end of the cylindrical chamber of the regenerator 23 a pipe 83 leads to pipes 83' and 84 in a similar manner to that described above in relation to the evaporator 18. The two series of tanks are thus coordinated in their operation by providing within the regenerator 23 a counterflow interchange of heat in the fluids passing from the evaporator to the absorber in one series and from the absorber to the evaporator in the other series. A more uniform output of steam is also obtained by the association of the two oppositely operating units.

It will be noted that the amount of caustic within each pair of evaporators and absorbers is constant and the loss of caustic solution, which may be due to leakage or to minute particles being carried out mechanically with the steam, need be replaced only at infrequent intervals.

The generator described above is thus seen to generate steam in each series of drums in two distinct enclosures. The main generation takes place in the tubular spaces of the absorbers 19 and 22, and is effected by the latent heat of exhaust steam, the heat of combination between the caustic and the exhaust steam and to some extent both directly and indirectly from heat from the furnace. A lesser quantity of steam is generated with the evaporators 18 and 21 from the diluted solutions of caustic resulting from the absorption of exhaust steam in the caustic within the absorber 19 and 22 and the subsequent concentration of the solutions effected by the heat transmitted from the primary heating fluid to the caustic solutions within the evaporators 18 and 21. The steam from the tubular chambers of the absorbers and from the cylindrical chambers of the evaporators is delivered to the heater 66, where its temperature is raised by contact with the furnace gases, and the combined volume passes therefrom through the superheaters 17 and 20 where it receives a high degree of superheat from the primary heating fluid.

While I have shown my invention in but one form, it will be obvious to those skilled in the art that it is not so limited but is susceptible of various other changes and modifications, without departing from the spirit thereof and I desire, therefore, that only such limitations shall be placed thereupon as are imposed by the prior art or as are specifically set forth in the appended claims.

What I claim is:

1. The method of generating steam comprising, in one unit, adding low-pressure steam to a fluid having high absorptive affinity for water vapor, then withdrawing the diluted fluid to a region of higher temperature for the generation of high-pressure steam; in another unit, adding low-pressure steam to a second body of fluid having high absorptive affinity for water vapor, then withdrawing the diluted second body of fluid to a region of higher temperature for the generation of high pressure steam; controlling the operations of the said units such that when one unit is absorbing low-pressure steam the other unit is generating high-pressure steam and vice versa; and bringing the bodies of high absorptive fluid in the two units into heat exchanging relation to each other during the transitions between the absorption of low-pressure steam and the generation of high-pressure steam.

2. The method of generating steam comprising absorbing low-pressure steam in a concentrated solution of an hydroxide of the alkaline group, utilizing the latent heat of the low-pressure steam and the heat of absorption to generate a separated body of high-pressure steam, heating a separated body of fluid, passing the heated, separated body of fluid in heat-transmitting relation with respect to the weakened solution of caustic for generating therefrom a high-pressure steam, and withdrawing the two bodies of high-pressure steam for useful work.

3. The method of generating steam comprising adding low-pressure steam to a fluid having high absorptive affinity for water vapor, utilizing the latent heat of the added steam and the heat of absorption to generate a separated body of high-pressure steam, heating a separated body of fluid, passing said body of heated fluid in heat-transmitting relation to the diluted high absorptive fluid for generating therefrom high-pressure steam, withdrawing the two bodies of high-pressure steam and commingling them to form a motive fluid, and passing the commingled motive fluid in heat exchanging relation to said separated body of heated fluid for further heating the motive fluid.

4. In a steam generator, an absorption chamber, an evaporation chamber at a lower level than the absorption chamber, means establishing communication between the top of the absorption chamber and the top of the evaporation chamber, the top of the absorption chamber and the bottom of the evaporation chamber, and the bottom of the absorption chamber and the bottom of the evaporation chamber, a valve in said first mentioned communicating means, a concentrated caustic solution for said chambers, means for admitting low-pressure steam to the absorption chamber, and means for heating the evaporation chamber, whereby when the valve is closed, the caustic solution will pass from the evaporation chamber to the absorption chamber and absorb steam delivered thereto, and when the valve is open, the diluted solution will pass to the evaporation chamber where steam will be driven off from the solution.

5. In a steam generator, an absorption chamber, an evaporation chamber at a lower level than the absorption chamber, a concentrated caustic solution for said chambers, a conduit establishing communication between the upper portions of the chambers, a valve in said conduit, means associated with the lower portions of the chambers through which the transfer of solution from one chamber to the other may be effected, means for admitting low-pressure steam to the absorption chamber, and means for heating the evaporation chamber, whereby when the valve is closed, the caustic solution will pass from the evaporation chamber to the absorption chamber and absorb steam delivered thereto, and when the valve is open, the diluted solution will pass to the evaporation chamber where steam will be driven off from the solution.

6. In a steam generator, an absorber, an evaporator, each of the two-fluid type, one of the chambers of the absorber and one of the chambers of the evaporator containing a concentrated caustic solution, conduits connecting the chambers in such manner that the caustic solution may pass from the bottom of the evaporation chamber to the top of the absorption chamber, and from the bottom of the absorption chamber to the bottom of the evaporation chamber, means for causing the caustic to pass alternately from one chamber to the other, means for adding low-pressure steam to the caustic solution in the absorber, means for heating caustic solution in the evaporator whereby steam is generated from the caustic solution.

7. In a steam generator, an absorption chamber, an evaporation chamber at a lower level than the absorption chamber, a concentrated caustic solution for the absorption and evaporation chambers, a conduit connecting the upper portions of the absorption and evaporation chambers, a valve in said conduit, a regenerator, a second conduit connecting the lower portion of the evaporation chamber with said regenerator, a third conduit connecting the lower portion of the absorption chamber to the regenerator, a check valve in said third conduit permitting a flow from the absorption chamber to the regenerator, a fourth conduit connecting the regenerator to the upper portion of the absorption chamber, means for admitting low-pressure steam to the absorption chamber, and means for heating the evaporation chamber, whereby when the valve is closed, the caustic solution will be forced from the evaporator through the regenerator, and into the upper portion of the absorption chamber to absorb the steam admitted thereto, and when the valve is open, the diluted solution will pass to the evaporation chamber where steam will be driven off therefrom.

8. In a steam generator, an absorption chamber, an evaporation chamber at a lower level than the absorption chamber, a concentrated caustic solution for the absorption and evaporation chambers, a conduit connecting the upper portions of the absorption and evaporation chambers, a valve in said conduit, a regenerator, a second conduit connecting the lower portion of the evaporation chamber with said regenerator, a third conduit connecting the lower portion of the absorption chamber to the generator, a check valve in said third conduit permitting a flow from the absorption chamber to the regenerator, a fourth conduit connecting the regenerator to the upper portion of the absorption chamber, a spray member at the end of said last mentioned conduit within the absorption chamber, means for admitting low-pressure steam to the absorption chamber, and means for heating the evaporation chamber, whereby when the valve is closed, the caustic solution will be forced from the evaporator through the regenerator, and sprayed into the upper portion of the absorption chamber to absorb the steam admitted thereto, and when the valve is open, the diluted solution will pass to the evaporation chamber where steam will be driven off therefrom.

9. In a steam generator, an upper two-fluid heater having an absorption chamber and a generating chamber, a lower two-fluid heater having an evaporation chamber and a heating chamber, means establishing communication between the top of the absorption chamber and the top of the evaporation chamber, the top of the absorption chamber and the bottom of the evaporation chamber, and the bottom of the absorption chamber and the bottom of the evaporation chamber, a valve in said first-mentioned communicating means, a concentrated caustic solution for the absorption and evaporation chambers, means for admitting low-pressure steam to the absorption chamber, means for delivering water to the generating chamber, means for passing a heated fluid through said heating chamber, whereby when the valve is closed the caustic solution will be forced from the evaporation chamber to the absorption chamber, absorb the steam delivered thereto and transmit heat to the generating chamber to generate steam therein, and when the valve is open, the diluted solution will pass to the evaporating chamber where steam will be driven off from the solution.

10. In a steam generator, an upper two-fluid heater having an absorption chamber and a generating chamber, a lower two-fluid heater having an evaporation chamber and a heating chamber, means establishing communication between the top of the absorption chamber and the top of the evaporation chamber, the top of the absorption chamber and the bottom of the evaporation chamber, and the bottom of the absorption chamber and the bottom of the evaporation chamber, a valve in said first-mentioned communicating means, a concentrated caustic solution for the absorption and evaporation chambers, means for admitting low-pressure steam to the absorption chamber, means for delivering water to the generating chamber, and withdrawing steam therefrom, and means for passing a heated fluid through said heating chamber, means for withdrawing steam from the evaporation chamber, and a heater into which the steam from the evaporation chamber and the generating chamber are led and from which the commingled bodies of steam are discharged in a superheated condition.

11. In a steam generator, an upper two-fluid heater having an absorption chamber and a generating chamber, a lower two-fluid heater having an evaporation chamber and a heating chamber, means establishing communication between the top of the absorption chamber and the top of the evaporation chamber, the top of the absorption chamber and the bottom of the evaporation chamber, and the bottom of the absorption chamber and the bottom of the evaporation chamber, a valve in said first-mentioned communicating means, a concentrated caustic solution for the absorption and evaporation chambers, means for admitting low-pressure steam to the absorption chamber, means for delivering water to the generating chamber and withdrawing steam therefrom, and means for passing a heated fluid through said heating chamber, means for withdrawing steam from the evaporation chamber, and a heater into which the steam from the evaporation chamber and the generating chamber are led and from which the commingled bodies of steam are discharged in a superheated condition, and means to pass said heated fluid into heating contact with the steam in said heater prior to the passage of the heating fluid to said heating chamber.

12. In a steam generator, a boiler, two vertical series of drums mounted above the boiler, each of said series comprising an absorption chamber, an evaporation chamber at a lower level than the absorption chamber, a concentrated caustic solution for said chambers, a conduit establishing communication between the upper portions of the chambers, a valve in said conduit, means associated with the lower portions of the chambers through which the transfer of solution from one chamber to the other may be effected, means for admitting low-pressure steam to the absorption chamber, and means for heating the evaporation chamber, whereby when the valve is closed, the caustic solution will pass from the evaporation chamber to the absorption chamber and absorb steam delivered thereto, and when the valve is open, the diluted solution will pass to the evaporation chamber where the steam will be driven off from the solution, and means associated with the valves of said series whereby when the valve of one series is opened, the valve of the other series is closed and vice versa.

13. In a steam generator, a boiler, two vertical series of drums mounted above the boiler, each of said series comprising an absorber, an evaporator connected therewith, means for cooling the absorbers and delivering thereto low-pressure steam, and means for heating the evaporators and generating high-pressure steam therein, a regenerator of the two-fluid type common to the two series, means for causing a caustic solution to pass from the evaporation chamber through one compartment of the regenerator to the absorption chamber in one series, and for causing a caustic solution to pass from the absorption chamber through the other compartment of the regenerator to the evaporation chamber in the other series, and vice versa, whereby a counter-flow heat exchange is effected between the caustic solution of the two series.

In testimony whereof, I have hereunto subscribed my name this first day of June, 1921.

ALEXANDER T. KASLEY.